May 2, 1961 W. F. JACKSON ET AL 2,982,300
FLOW CONTROL DEVICE
Filed Aug. 19, 1957

INVENTORS.
Wilbur F. Jackson.
John W. Wright.
BY
ATTORNEY.

United States Patent Office
2,982,300
Patented May 2, 1961

2,982,300
FLOW CONTROL DEVICE

Wilbur F. Jackson, Compton, and John W. Wright, Long Beach, Calif., assignors to Robertshaw-Fulton Controls Company, Richmond, Va., a corporation of Delaware Filed Aug. 19, 1957, Ser. No. 678,805

3 Claims. (Cl. 137—495)

This invention relates to flow control devices and more particularly to pressure responsive regulating devices.

An object of this invention is to regulate and control a flow of fluid by a unitary control device.

Another object of this invention is to combine a pressure regulating valve and a shut-off valve into a unitary control device.

This invention has another object in combining a shut-off valve, a pressure regulating valve and an electromagnet operating means into a unitary, compact casing.

It is another object of this invention to control manually, regulate automatically, and to control automatically a flow of fluid by a unitary control device.

It is a further object of this invention to combine an electromagnetic actuator with a straight through pressure regulator.

In the preferred embodiment of this invention, a flow control device is provided with a through bore which is intersected by a rotatable shut-off valve having a through bore for alignment with the first through bore. A regulating valve having a substantially conical shape intersects the bore in the shut-off valve and is automatically movable therein in response to pressure variations. Resilient means biases the regulating valve toward an open position and diaphragm means moves the same against such bias toward a closed position. The armature of an electromagnet is operatively connected to the regulating valve and moves the same to its closed position whenever the electromagnet is de-energized.

Figure 1:
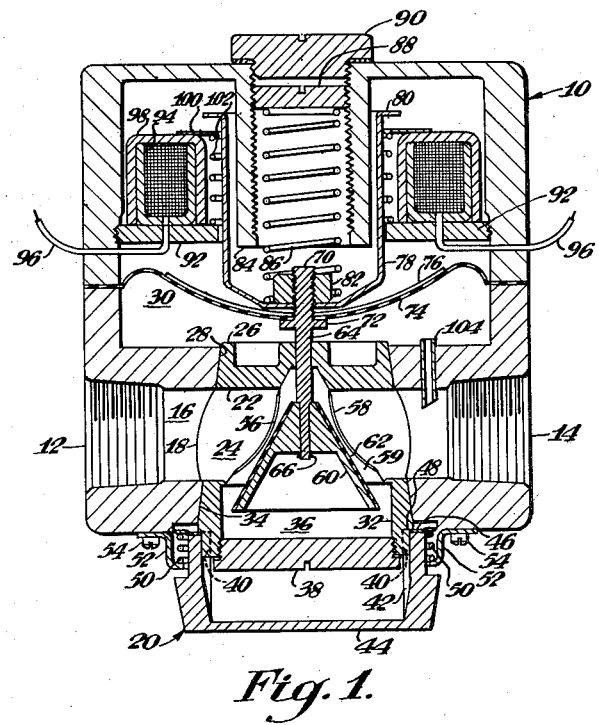
Figure 2:
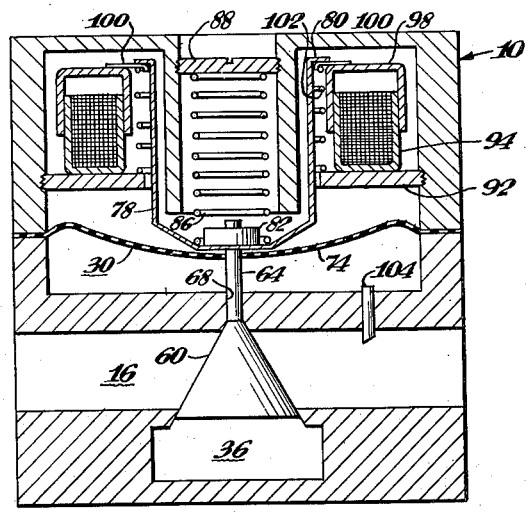

Other objects and advantages of this invention will become apparent from the following description when taken in connection with the accompanying drawing wherein:

Fig. 1 is a vertical cross-section through a control device embodying this invention showing a regulating valve member in its regulating position; and Fig. 2 is a schematic view of the control device shown in Fig. 1 with its regulating valve in a closed position.

Referring now to the drawing, the control device casing, indicated generally at 10, has a lower portion provided with an inlet passage 12 and an outlet passage 14. Passages 12 and 14 are diametrically opposite and coaxial and form a through bore 16 for the casing 10. The medial portion of bore 16 forms a valve chamber defined by an upwardly tapered conical valve seat 18 the axis of which intersects the axis of through bore 16 at a right angle.

A shut-off cock, indicated generally at 20, has a hollowed body portion 22 extending into casing 10 perpendicularly to the axis of the through bore 16. Valve body member 22 is conical in shape to conform to the shape of the valve seat 18 and is provided with a diametrical through bore 24 which is alignable with bore 16 to permit a straight through flow of fluid from inlet passage 12 to outlet passage 14. The inner small end 26 of valve body 22 is received in a tapered opening 28 leading from bore 16 to a diaphragm chamber 30. The outer larger end 32 of valve body 22 protrudes through a tapered opening 34 diametrically opposed to opening 30 and leading from bore 16 to the exterior of casing 10.

The outer end 32 of valve body 22 is bored to form a chamber 36 for a purpose to be described hereinafter. A sealing plug 38 is threaded into the outer end 32 and seals the chamber 36. On its exterior periphery, the outer end 32 is provided with a plurality of slots 40 which receive cooperating ribs 42 on a manually rotatable dial 44. Slots 40 and ribs 42 permit unitary rotation of valve body 22 and dial 44 and together with spring friction means (not shown) facilitate removal of dial 44.

An annular offset retainer plate 46 has an inner portion bearing against an annular ledge 48 on the outer end 32 of valve body 22. A coil spring 50 encircles a portion of dial 44 and is mounted in compression between retainer plate 46 and a second annular offset retainer plate 52 which is fastened to casing 10 by any suitable means, such as bolts 54. The bias exerted by coil spring 50 provides a spring loaded mounting for the shut-off valve 20.

Valve body 22 is hollowed out at the central portion of bore 24 to form a pair of opposed tapering valve seats 56, 58 having an approximately constant, narrow width. The substantial conical shape of valve seats 56, 58 is obtained by the intersection of a cone at a right angle with the cylindrical bore 24. This central portion of bore 24 forms a supplemental chamber 59 defined by the valve seats 56, 58 and having a bottom opening to communicate with chamber 36.

A regulating valve member 60 is substantially cone shaped with a resilient outer face 62 and is movably disposed in bore 24 to cooperate with the valve seats 56, 58. From Fig. 1, it will be observed that valve member 60 is mounted on the reduced end of valve stem 64 in a free fitting manner by means of a split retaining ring 66 to allow some tolerance for misalignment of valve member 60 with the valve seats.

The medial portion of valve stem 64 is slidably disposed in a guide hole 68 which extends through the inner end 26 of valve body 22. Valve stem 64 has a threaded end 70 extending into diaphragm chamber 30 and is provided with an annular flange 72 spaced axially from the extremity of threaded end 70. A flexible diaphragm member 74 having a rigid backing support 76 has a central aperture for mounting diaphragm 74 on the threaded end 70 into engagement with annular flange 72. The periphery of diaphragm 74 is clamped between adjacent surfaces of the upper and lower portion of casing 10 to divide diaphragm chamber 30 into an upper and lower portion.

A valve actuating member 78 has a generally cup-shaped configuration with an annular flange 80 extending outwardly from its lip portion and a mounting aperture through the center of its base portion. Valve actuator 78 is mounted on the threaded end 70 of valve stem 64 and engages the backing support 76 of diaphragm 74. A seal is formed between the upper and lower portions of diaphragm chamber 30 by means of a lock nut 82 being threaded onto the threaded end 70 to compress the central portion of diaphragm 74 against the annular flange 72. Lock nut 82 fastens the diaphragm 74, its backing support 76, and actuator 78 onto valve stem 64 for unitary movement therewith.

A tubular spring guide 84 projects downwardly from the center of the top of casing 10 into the cup-shaped actuator 78 to form a telescopic arrangement therewith. Yieldable means in the form of a regulating coil spring 86 in the tubular spring guide 84 has one end encircling lock nut 82 and is compressed between the base portion of actuator 78 and an adjusting nut 88 which is threaded into the upper end of guide 84. A sealing plug 90 closes the upper end of guide 84 and is removable to provide an access to adjusting nut 88 for adjusting the compression of coil spring 86.

The upper portion of diaphragm chamber 30 is provided with an annulus secured to the interior wall of casing 10 to form a supporting ledge 92 which encircles a part of actuator 78 with sufficient clearance for the free movement thereof. An electromagnet has an annular coil 94 mounted on the ledge 92 and lead lines 96 extending through suitable sealing means (not shown) in casing 10 for connection to a suitable energizing circuit. An annular armature 98 for the electromagnet has an inverted U-shaped cross-section so that it slides vertically on the housing of annular coil 94. As is illustrated in Fig. 2, a spring retainer in the form of an annulus 100 is affixed to the top of armature 98 so that its inner periphery underlies actuator flange 80 for engagement therewith. The retaining annulus 100 encircles the actuator 78 with a minimum clearance to permit relative vertical movement therebetween. Yieldable means in the form of a coil spring 102 encircles actuator 78 and is mounted in compression between ledge 92 and spring retainer 100. An orifice tube 104 establishes communication between the lower portion of diaphragm chamber 30 and the outlet passage 14 so that diaphragm 74 moves the regulating valve member 60 toward a closed position in response to pressure in the outlet passage 14. The upper portion of diaphragm chamber 30 is vented to the atmosphere by any suitable orifice means (not shown).

In the following description of the operation of this control device, it will be assumed that electrical switching means is arranged to energize the electromagnet when it is desired to supply a fuel gas to a burner. To place the control device in operation, the dial 44 is manually rotated to an "On" position whereby the bore 24 is aligned with bore 16 to provide a straight through flow. Upon energization of the electromagnet, armature 98 is attracted to coil 94 causing spring retainer 100 to compress coil spring 102 and move out of engagement with flange 80 on the valve actuating member 78. In such a released position, the valve actuating member 78 is free for unitary movement with valve stem 64.

The compression of regulating spring 86 is adjusted by rotation of nut 88 in accordance with the outlet pressure which it is desired to maintain. With no flow of gas, the biasing force exerted by regulating spring 86 moves the valve member 60 to a fully opened position where its lower portion extends into the chamber 36. With flow of fuel through the bore 24, the outlet pressure, by means of orificed tube 104, is sensed by diaphragm 74 causing regulating valve member 60 to move against the biasing force of regulating spring 86 toward the valve seats 56, 58. When the diaphragm force caused by the outlet pressure is equal to the biasing force exerted by regulating spring 86, the regulating valve member 60 is in a state of equilibrium and the flow of gas through the control device is constant. Pressure variations of the gas flow varies the diaphragm force causing corresponding movement of the regulating valve member 60 so that the gas flow from outlet passage 14 is maintained at a constant pressure.

Upon de-energization of the electromagnet, coil spring 102 moves retainer 100 and armature 98 away from magnet coil 94. The bias exerted by coil spring 102 forces retainer 100 into engagement with flange 80 causing upward movement of valve actuating member 78. As is illustrated in Fig. 2, movement of valve actuating member 78 to its biased position effects simultaneous movement of valve stem 64 against the bias of regulating spring 86 whereby the regulating valve member 60 is moved to a closed position in engagement with valve seats 56, 58.

When the regulating valve member 60 is in its regulating position, the upstream side of the valve member is subjected to the force of the fluid flow. This force approaches a maximum when the valve member 60 is in a minimum opened position because it present a greater surface area to the fluid flow. Such a force would affect the desired regulation by normally tilting regulating valve member 60 to cause lateral movement thereof toward valve seat 58. However, the regulating valve member 60 shown in Fig. 1 is stabilized through its stem 64 by means of the retaining annulus 100 which encircles the cup-shaped actuator 78 with a minimum clearance therebetween. The minimum clearance is sufficient for vertical movement between retaining annulus 100 and actuator 78 but horizontal movement is prevented. Thus, any tendency of the regulating valve member 60 to move laterally is precluded by retaining annulus 100 which serves as a horizontal stop member for actuator 78.

From the foregoing, it is apparent that shut-off cock 20 is manually rotated to control a flow of fluid through the casing 10, that the regulating valve memer 60 is automatically operated by regulating spring 86 and diaphragm 74 to regulate the flow of fluid, and that the electromagnet is operatively connected to the regulating valve member 60 to cut off automatically the flow of fluid in response to some predetermined condition.

Only one embodiment of the invention has been shown and described herein and inasmuch as this invention is subject to many variations, modifications and reversal of parts, it is intended that all matter contained in the above decription of the drawing shall be interpreted as illustrative and not in a limiting sense.

We claim:

1. A flow control and pressure regulating device comprising in combination, a valve casing having inlet and outlet passages for fluid intersected by a valve seat, a valve member movable relative to said seat and normally biased away from said seat, said casing defining a chamber on one side of said valve seat, an annular partition defining with said casing an upper and a lower section in said chamber, pressure responsive means supported within said lower chamber section and operable under varying fluid pressure for moving said valve member against its bias toward said seat, actuator means extending from said upper chamber section through said partition into operative engagement with said valve and diaphragm members, electromagnetic means including an armature and coil relatively movable between attracted and released positions, said armature being guided by said coil during relative movement, said electromagnetic means being supported on said partition in said upper chamber section and laterally spaced from said actuator means, yieldable means positioned in said space and operative between said partition and said electromagnetic means for biasing the latter to said released position, and an operative connection effective between said actuator and said electromagnetic means in said released position thereof for causing movement of said valve member toward said seat irrespective of said fluid pressure and effective between said actuator and said electromagnetic means in said attracted position thereof for stabilizing said valve member when operating under varying fluid pressure.

2. A flow control and pressure regulating device comprising in combination, a valve casing having inlet and outlet passages for fluid intersected by a valve seat, a valve member movable relative to said seat and normally biased away from said seat, said casing defining a chamber on one side of said valve seat, an annular partition defining with said casing an upper and lower section in said chamber, pressure responsive means supported within said lower chamber section and operable under varying fluid pressure for moving said valve member against its bias toward said seat, actuator means within said upper chamber section and projecting through said partition, means for securing said projection of said actuator means in operative engagement with said valve and diaphragm members, annular electromagnetic means including an armature and coil relatively movable between attracted and released positions, said armature being guided by said coil during relative movement, said electromagnetic means being supported on said partition in said upper chamber section in lateral spaced coaxial relation with said actuator means, coil spring means positioned in said space and operative between said partition and said electromagnetic means for biasing the latter to said released position, and cooperating abutment means on said actuator and electromagnetic means forming an operative connection effective therebetween in said released position of said electromagnetic means for causing movement of said valve member toward said seat irrespective of said fluid pressure and effective therebetween in said attracted position of said electromagnetic means for guiding the movement of said valve member when operating under varying fluid pressure.

3. A flow control and pressure regulating device comprising in combination, a valve casing having inlet and outlet passages for fluid intersected by a valve seat, a valve member movable relative to said seat and normally biased away from said seat, said casing defining a chamber on one side of said valve seat, an annular partition defining with said casing an upper and a lower section in said chamber, said lower section being connected for receiving fluid pressure from said outlet passage, pressure responsive means supported within said lower chamber section and operable under varying fluid pressure for moving said valve member against its bias toward said seat, tubular actuator means having a flanged end within said upper chamber section and an opposite end projecting through said partition into said lower chamber section, means for securing said opposite end of said actuator means in operative engagement with said valve and diaphragm members, annular electromagnetic means including an armature and coil relatively movable between attracted and released positions, said armature being guided by said coil during relative movement, said electromagnetic means being supported on said partition in said upper chamber section in laterally spaced coaxial relation with said actuator means, annular retainer means on said electromagnetic means underlying said flanged end of said actuator means, and coil spring means positioned in said space and operative between said partition and said retainer means for biasing said electromagnetic means to said released position, said flanged end and said retainer means forming an operative connection effective between said actuator and said electromagnetic means in said released position thereof for causing movement of said valve member toward said seat irrespective of said fluid pressure and effective between said actuator and said electromagnetic means in said attracted position thereof for guiding the movement of said valve member when operating under varying fluid pressure.

References Cited in the file of this patent

UNITED STATES PATENTS

| | | |
|---|---|---|
| 1,197,860 | Schneider | Sept. 12, 1916 |
| 1,692,421 | Schlusselburg | Nov. 20, 1928 |
| 2,010,872 | Mantz | Aug. 13, 1935 |
| 2,147,850 | MacLean | Feb. 21, 1939 |
| 2,212,762 | Wittmann | Aug. 27, 1940 |
| 2,237,784 | Iler | Apr. 8, 1941 |
| 2,372,537 | Wantz | Mar. 27, 1945 |
| 2,668,396 | Kern | Feb. 9, 1954 |
| 2,721,570 | Caparone | Oct. 25, 1955 |
| 2,757,683 | Biggle | Aug. 7, 1956 |
| 2,842,146 | Schuster | July 8, 1958 |